(12) United States Patent
Yang

(10) Patent No.: US 11,585,483 B2
(45) Date of Patent: Feb. 21, 2023

(54) OUTDOOR APPLIANCE AND SUPPORT FRAME THEREOF

(71) Applicant: Zhejiang Hengfeng Top Leisure Co., Ltd., Zhejiang (CN)

(72) Inventor: Baoqing Yang, HangZhou (CN)

(73) Assignee: ZHEJIANG HENGFENG TOP LEISURE CO., LTD., Zhejiang (CN)

( * ) Notice: Subject to any disclaimer, the term of this patent is extended or adjusted under 35 U.S.C. 154(b) by 197 days.

(21) Appl. No.: 17/108,080

(22) Filed: Dec. 1, 2020

(65) Prior Publication Data
US 2021/0388939 A1    Dec. 16, 2021

(30) Foreign Application Priority Data

Jun. 15, 2020   (CN) .......................... 202010542342.1
Jun. 15, 2020   (CN) .......................... 202021102120.X

(51) Int. Cl.
  *E04H 15/48*   (2006.01)
  *F16M 11/38*   (2006.01)
  *A47C 19/12*   (2006.01)
  *A47C 4/28*    (2006.01)

(52) U.S. Cl.
  CPC .............. *F16M 11/38* (2013.01); *A47C 4/28* (2013.01); *A47C 19/12* (2013.01); *E04H 15/48* (2013.01)

(58) Field of Classification Search
  USPC ....... 135/114, 128, 130, 131, 133, 143, 144, 135/145
  See application file for complete search history.

(56) References Cited

U.S. PATENT DOCUMENTS

| | | | | |
|---|---|---|---|---|
| 4,979,531 A * | 12/1990 | Toor | .......................... | E04H 15/60 135/905 |
| 5,361,794 A * | 11/1994 | Brady | ..................... | E04H 15/48 135/147 |
| 5,546,971 A * | 8/1996 | Leonhardt | ............. | E04H 15/003 135/909 |
| 6,286,531 B1* | 9/2001 | Joo-Tai | ................... | E04H 15/60 135/114 |
| 8,985,130 B2* | 3/2015 | Howarth | ................... | F16B 7/04 135/120.3 |
| 2003/0047203 A1* | 3/2003 | Lah | ......................... | E04H 15/48 135/65 |
| 2003/0089390 A1* | 5/2003 | Seo | ........................ | E04H 15/60 135/120.4 |

(Continued)

*Primary Examiner* — Alfred J Wujciak
(74) *Attorney, Agent, or Firm* — Thompson Coburn LLP

(57) ABSTRACT

An outdoor appliance has a support frame with multiple inner lining tubes that are sequentially connected end to end by flexible ropes and multiple outer sleeve tubes that are slidable on the outer surfaces of the inner lining tubes. The outer sleeve tube and the inner lining tube at the head end of the support frame are respectively connected to an elastic member. When the support frame is in a locked state, each inner lining tube is located between and supports two abutting adjacent outer sleeve tubes. When the support frame is in an unlocked state, each inner lining tube is moved out of one outer sleeve tube and into the next successively (e.g., longitudinal) axially adjacent outer sleeve tube against the force of the elastic member such that the radial support between adjacent outer sleeve tubes is eliminated thereby allowing the support frame to be folded.

20 Claims, 5 Drawing Sheets

(56) References Cited

U.S. PATENT DOCUMENTS

| | | | |
|---|---|---|---|
| 2008/0169626 A1* | 7/2008 | Nostrant | F16M 11/38 280/293 |
| 2009/0020146 A1* | 1/2009 | Bong | E04H 15/425 135/114 |
| 2015/0376912 A1* | 12/2015 | Livacich | E04H 15/60 135/120.3 |

* cited by examiner

OUTDOOR APPLIANCE AND SUPPORT FRAME THEREOF

RELATED APPLICATION DATA

This application claims priority to Chinese patent application serial no. 202010542342.1 filed Jun. 15, 2020, and Chinese utility model application serial no. 202021102120.X filed Jun. 15, 2020, the disclosures of which are incorporated by reference herein.

BACKGROUND

This application relates to the technical field of outdoor recreational gear, and in particular, to an outdoor recreational equipment and furniture, for instance, a portable bed or cot, and a support frame thereof.

In order to ease the fatigue of a journey and more easily enjoy the outdoors, travelers generally carry outdoor recreational gear, such as tents, beds, cots, and seats. Considering the limited storage space of automobiles, existing outdoor recreational equipment and furniture are generally foldable to reduce space. The conventional foldable outdoor recreational equipment and furniture generally has a foldable support frame built in. In order to achieve folding, the existing support frame generally includes multiple sleeve rods which are sequentially nested end to end. A thermoplastic elastomer (TPE) rope is fixedly connected between the first and the last sleeve rods, and the nested sleeve rods rely on the elastic force of the TPE rope to provide support. When in use, due to the limited elastic force of the TPE rope, the sleeve rods that are nested with each other may be broken apart due to a strong wind and other factors, and the overall support frame may fail. The stability of the existing support frame is relatively weak. When disassembling or assembling the existing support frame, the support frame can only be disassembled or assembled after the support frame is separated from an installation hole of a part to be supported, the part to be supported needs to be removed from the support frame frequently, and the sleeve rods need to be assembled or disassembled section by section. The disassembly and assembly operation is complicated, and the support frame is sometime difficult to use.

What is needed is a more optimal structure of a support frame for outdoor recreational equipment and furniture to improve the convenience of use and stability.

SUMMARY

In view of this, an object of the present application is to provide improved outdoor recreational equipment and furniture and a support frame thereof. The support frame of the outdoor recreational equipment and furniture according to the present application includes:

multiple inner lining tubes connected end to end by flexible ropes, multiple outer sleeve tubes mounted on the outer circumferences of the inner lining tubes, and an elastic member having a first end fixedly connected to the outer sleeve tube at a head end of the support frame and a second end fixedly connected to the inner lining tube at the head end of the support frame, when the support frame is in a locked state, the elastic member is neither stretched or compressed, and each inner lining tube is located between two adjacent outer sleeve tubes, so that all outer sleeve tubes are axially butted in sequence to provide support for the support frame; and when the support frame is in an unlocked state, the elastic member is stretched, and each inner lining tube is moved axially into the adjacent outer sleeve tube, so that all outer sleeve tubes are bendable along with the flexible ropes to achieve folding.

Preferably, the sum of the length of a single inner lining tube and the length of the flexible rope connected to one end of the inner lining tube is equal to the length of a single outer sleeve tube. A stopper is fixed in one outer sleeve tube. When the support frame is in the unlocked state, the inner lining tube in the outer sleeve tube provided with the stopper abuts against the stopper to prevent the inner lining tube from moving axially under the pulling force.

Preferably, the number of outer sleeve tubes is one more than the number of inner lining tubes.

Preferably, the cross section area of each inner lining tube is smaller than the cross section area of a central hole of the outer sleeve tube, so that the inner lining tube can slide smoothly in the central hole of the outer sleeve tube.

Preferably, the inner lining tube at the tail end is provided with a pull ring, and the pull ring is connected to the inner lining tube at the tail end by the flexible rope.

Preferably, flared flanges, which are folded outward along the radial direction of the outer sleeve tubes, are respectively provided at two ends of each outer sleeve tube, and the flared flanges are configured to guide the inner lining tubes to slide into the outer sleeve tubes.

Preferably, the flexible rope is a steel wire rope.

Preferably, the elastic member is specifically a TPE rope or a tension spring.

The outdoor recreation equipment and furniture according to the present application includes a carrying cover with a mounting hole and the support frame according to any one of the above aspects, and the support frame is installed in the mounting hole.

Compared with the background technology, the support frame of the present application provides multiple inner lining tubes sequentially connected end to end by flexible ropes, multiple outer sleeve tubes are independently sleeved on the outer circumferences of the inner lining tubes, and the outer sleeve tube at the head end and the inner lining tube at the head end are respectively fixedly connected with the elastic member.

When the support frame is in the locked state, each inner lining tube is located between two adjacent outer sleeve tubes, and each inner lining tube can prevent the two surrounding adjacent outer sleeve tubes from bending, so that all outer sleeve tubes are axially butted in sequence to provide support for the support frame. The two adjacent outer sleeve tubes rely on the inner lining tube to achieve rigid support, which can effectively prevent the two adjacent outer sleeve tubes from departing from each other due to excessive radial force, making the support of the outer sleeve tubes more stable and reliable.

When the inner lining tube is pulled, the inner lining tube then pulls the elastic member connected to the inner lining tube, and the inner lining tube overcomes the elastic force of the elastic member and moves axially relative to the outer sleeve tube under the action of the pulling force. When the support frame is in the unlocked state, each inner lining tube is moved axially into the adjacent outer sleeve tube, and the radial support between each two adjacent outer sleeve tubes is eliminated, so that all outer sleeve tubes can be bent along with the flexible ropes, thereby achieving folding for the support frame.

When the user uses the support frame, an inner lining tube is pulled, and the inner lining tube overcomes the elastic force of an elastic member and moves axially relative to an outer sleeve tube. When a single inner lining tube is moved to a position between two adjacent outer sleeve tubes, the outer sleeve tubes can be butted, and when a single inner lining tube is completely moved into an adjacent outer sleeve tube, the outer sleeve tube can be folded. The support frame can be disassembled or assembled by pulling the inner lining tubes as needed, there is no need to disassemble or assemble the support frame section by section, and there is no need to remove the part to be supported from the support frame for disassembling and assembling the support frame. The disassembly and assembly operation is simple. Adjacent outer sleeve tubes are supported by the inner lining tube, and the support is relatively stable, so the convenience and stability of the support frame are both improved.

Therefore, the convenience and stability of the support frame of the outdoor recreation equipment and furniture provided by the present application are improved, and outdoor recreation equipment and furniture having the above described support frame has the same beneficial effects.

BRIEF DESCRIPTION OF THE DRAWINGS

For purposes of more clearly illustrating the principles of the present application or the technical solutions in the conventional technology, the drawings and description will refer to one or more embodiments of the support frame and the outdoor recreational equipment and furniture. The drawings and the following description are only examples and not limiting in any sense, and variations of the embodiments may become obvious to those skilled in the art.

DETAILED DESCRIPTION

Figure 1:
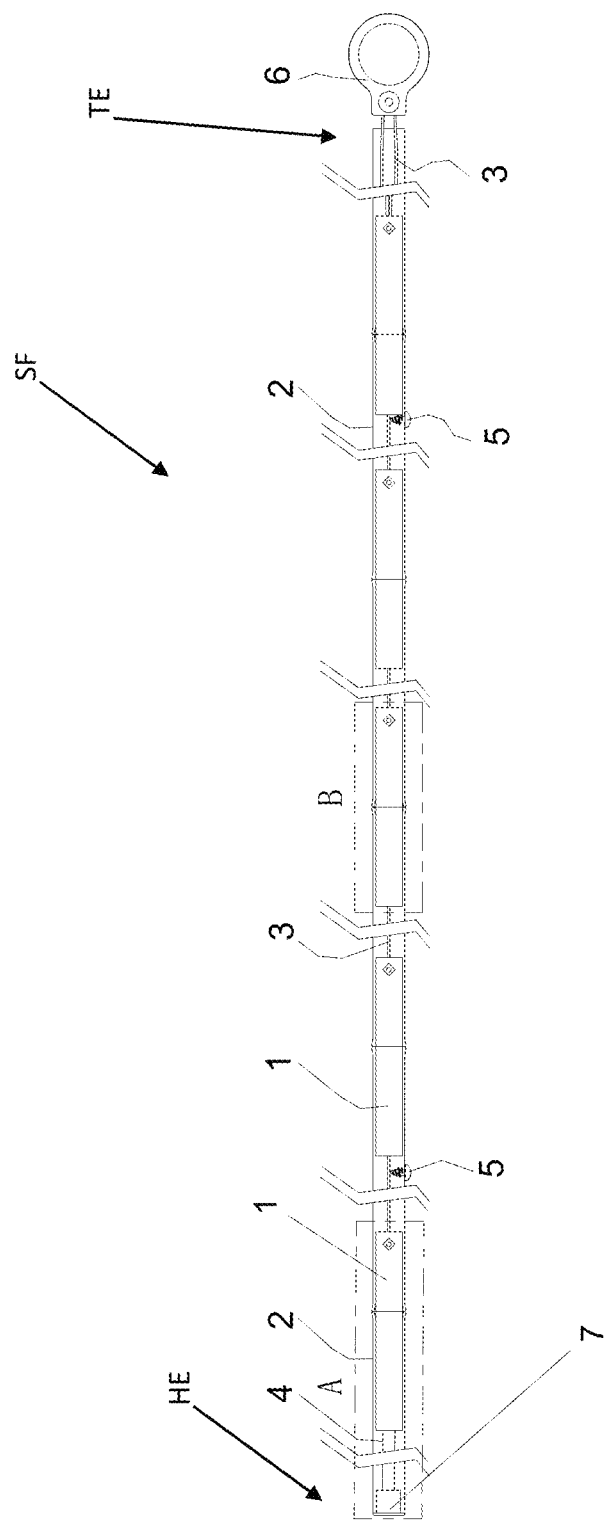
FIG. 1 is a structural diagram of a support frame of an item of outdoor recreation equipment and furniture provided by a specific embodiment of the present application, wherein the support frame is in a locked state.

A support frame SF of an item of outdoor recreation equipment and furniture is disclosed according to embodiments of the present application, which includes multiple inner lining tubes 1, multiple outer sleeve tubes 2, and an elastic member 4. The multiple inner lining tubes 1 are connected end to end by flexible ropes 3. In other words, any two adjacent inner lining tubes 1 are fixedly connected to each other by the flexible rope 3. The flexible rope 3 can be bent along a radial direction of the inner lining tube 1. While the drawings show that all the inner lining tubes 1 have the same length, the lengths of the inner lining tubes may vary. The flexible rope 3 may be a steel rope but is not limited thereto.

The multiple outer sleeve tubes 2 are independently sleeved on the outer circumferences of the inner lining tubes 1. In other words, any two adjacent outer sleeve tubes 2 are not connected together. In this specific embodiment, the inner lining tubes 1 and the outer sleeve tubes 2 are arranged coaxially.

Figure 2:
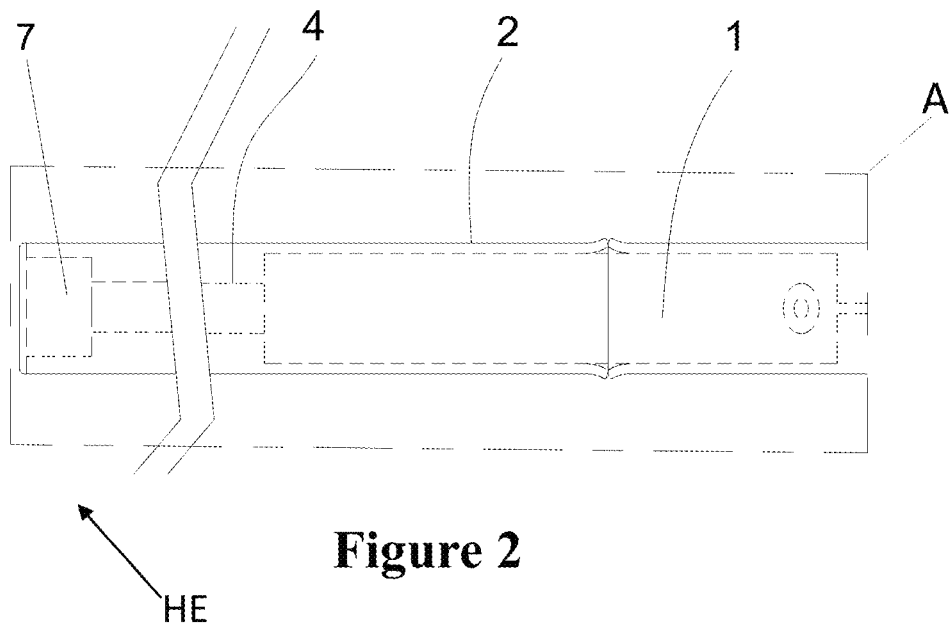
FIG. 2 is a partial enlarged view of portion A in FIG. 1.
Figure 3:
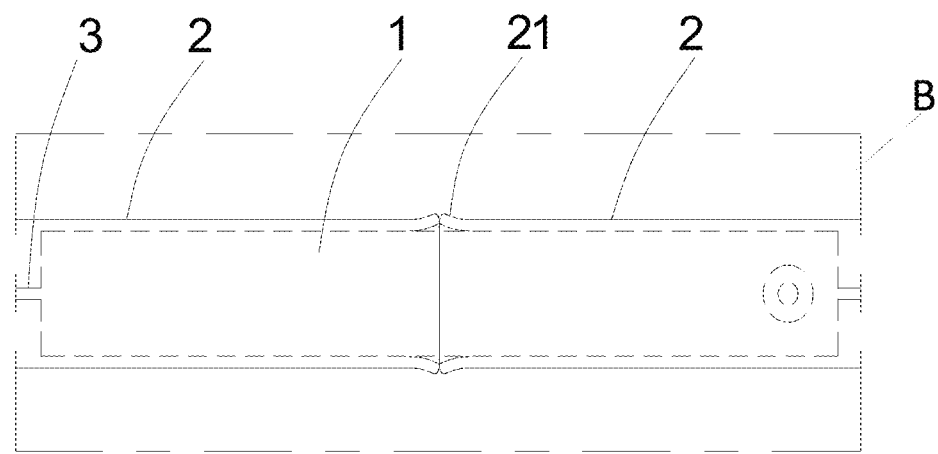
FIG. 3 is a partial enlarged view of portion B in FIG. 1.

Referring to FIG. 2, the outer sleeve tube 2 at a head end HE (e.g., proximal end) of the support frame and the inner lining tube 1 at the head end HE of the support frame are respectively fixedly connected to two ends of the elastic member 4, so that the elastic member 4 drives the inner lining tube 1 to move axially relative to the outer sleeve tube 2 by elastic deformation. For ease of illustration, it should be noted that in FIG. 1, the outer sleeve tube 2 at the head end HE specifically refers to the outer sleeve tube 2 at the leftmost end, and the inner lining tube 1 at the head end HE specifically refers to the inner lining tube 1 at the leftmost end.

A plug 7 may be fixedly provided at the leftmost end of the outer sleeve tube 2 at the head end. The plug 7 may be fixed in the outer sleeve tube 2 by screw threads. One end of the elastic member 4 (i.e., the end away from the inner lining tube 1) may be fixed to the plug 7. The method of fixing the end of the elastic member 4 to the plug 7 may be varied depending upon the nature of the elastic member 4. For instance, the elastic member 4 may be a TPE rope or a tension spring or other resiliently elastic material, and the plug 7 may be modified as necessary to make the connection with the elastic member.

When the support frame is in the locked state as shown in FIG. 1, each inner lining tube 1 is located between two adjacent outer sleeve tubes 2, and each inner lining tube 1 can prevent the two surrounding adjacent outer sleeve tubes 2 from bending along the radial direction, so that all outer sleeve tubes 2 are axially butted in sequence to provide support. The two adjacent outer sleeve tubes 2 rely on the inner lining tube 1 to achieve rigid support, which can effectively prevent the two adjacent outer sleeve tubes 2 from departing from each other due to excessive radial force, making the support of the outer sleeve tubes 2 more stable and reliable. The locked state herein refers to a state in which the elastic member 4 is neither stretched nor compressed but in a relaxed condition.

Figure 4:
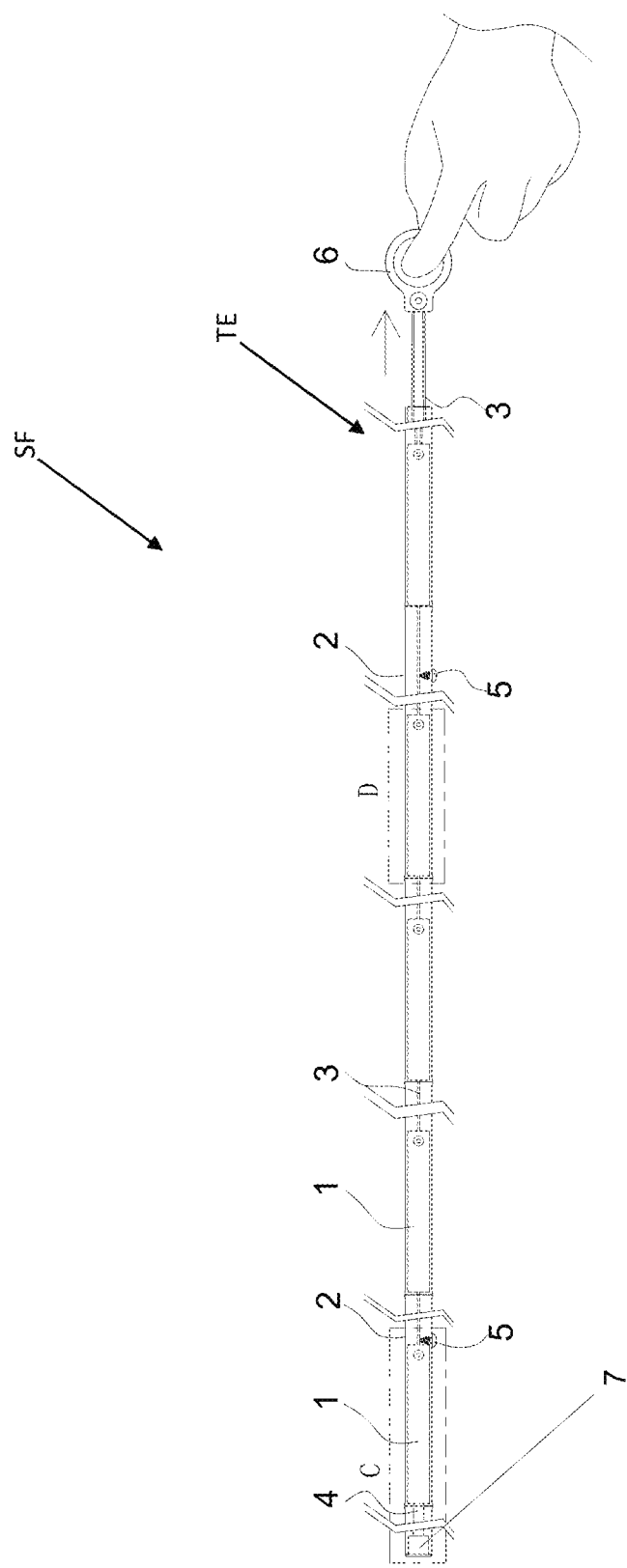
FIG. 4 is a structural diagram of the support frame of the item of outdoor recreation equipment and furniture provided by a specific embodiment of the present application, wherein the support frame is in an unlocked state.
Figure 5:
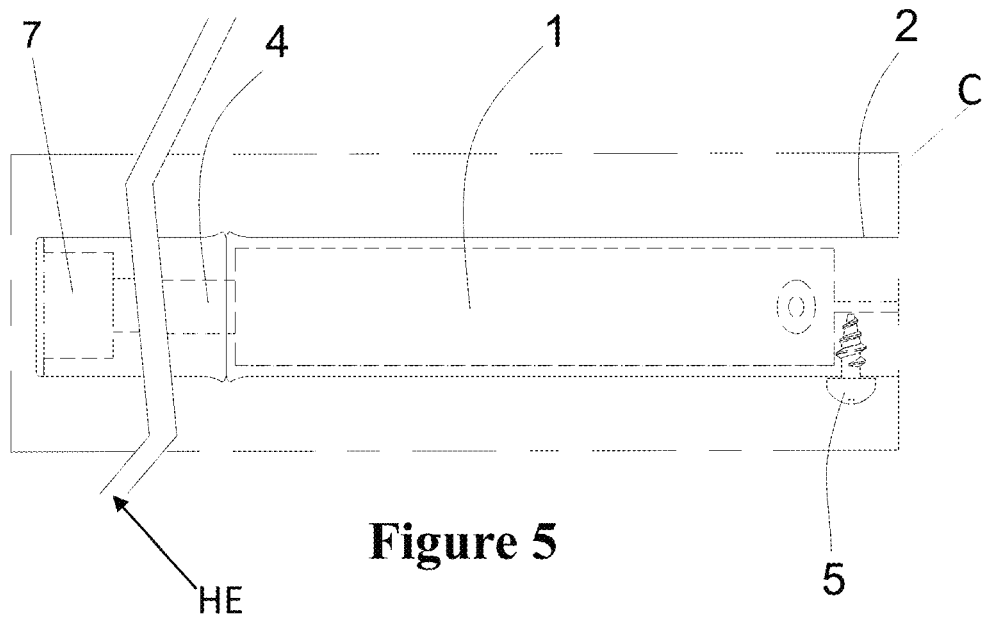
FIG. 5 is a partial enlarged view of portion C in FIG. 3.
Figure 6:
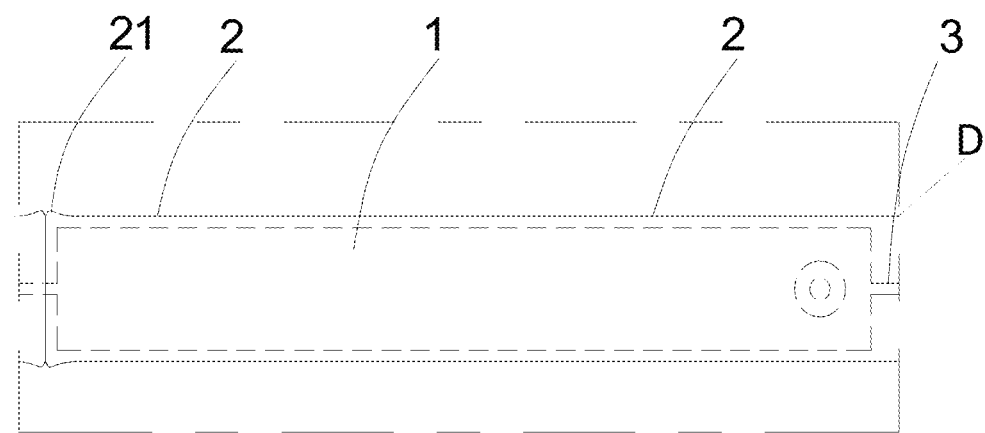
FIG. 6 is a partial enlarged view of portion D in FIG. 3.
Figure 7:
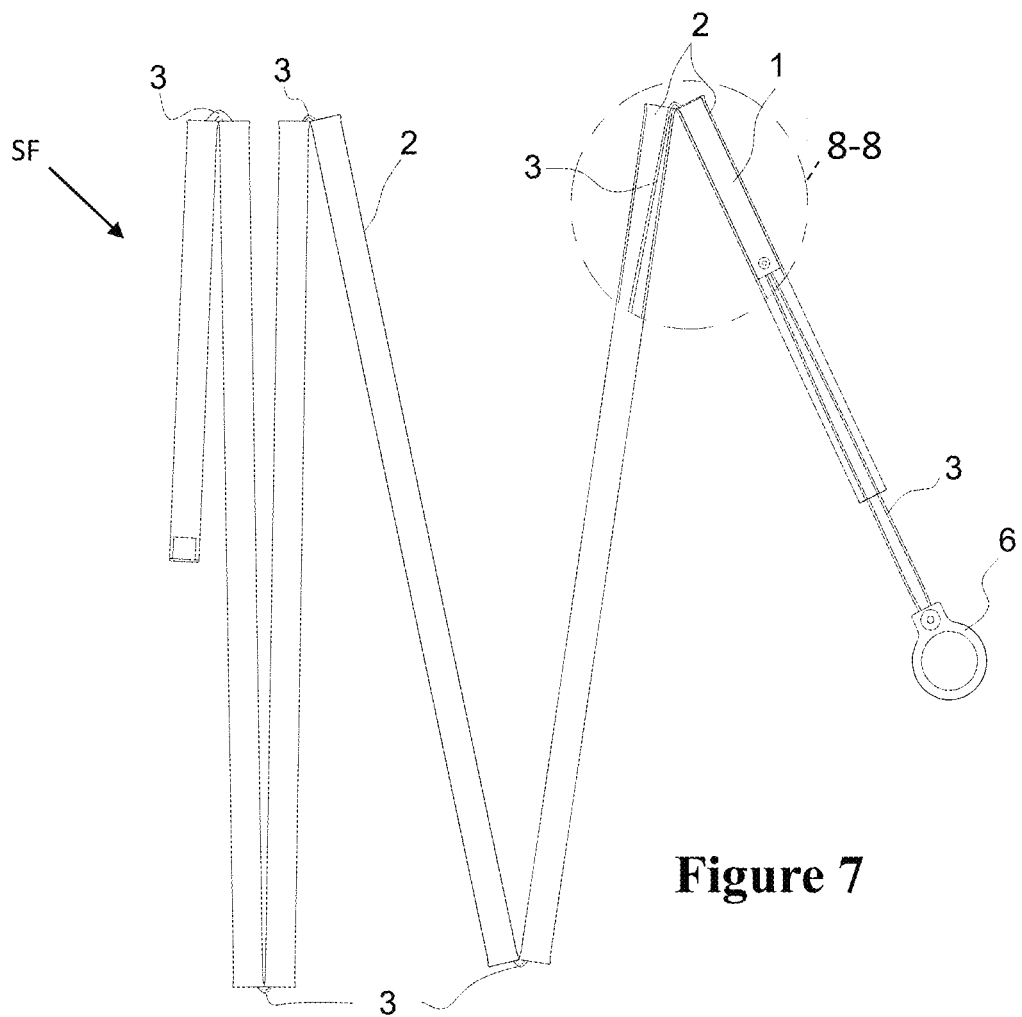
FIG. 7 is a structural diagram of the support frame of the item of outdoor recreation equipment and furniture provided by a specific embodiment of the present application, wherein the support frame is in a folded state.
Figure 8:
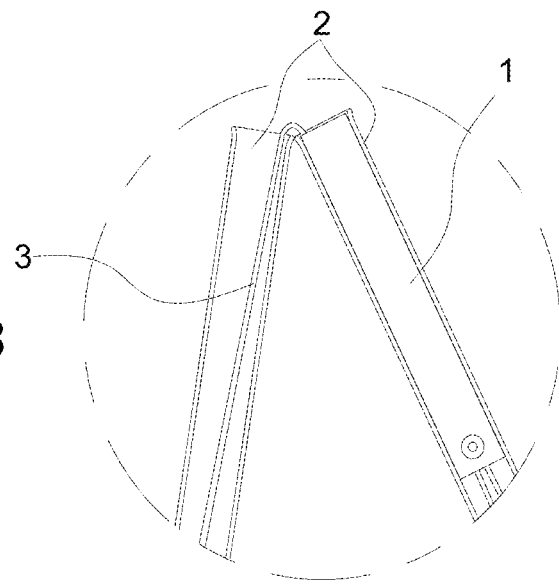
FIG. 8 is a partial enlarged view of portion E in FIG. 5.

When moving the support frame from the locked state to the unlocked state, the inner lining tube 1 is pulled in an axial direction which in turn allows the inner lining tube 1 at the head end HE to pull the elastic member 4. The elastic member 4 is then stretched longer, and the inner lining tube 1 at the head end HE overcomes the elastic force of the elastic member 4 and moves axially relative to the outer sleeve tube 2 at the head end HE under the action of the pulling force. In moving the support frame to the unlocked state, the elastic member 4 is stretched, and each inner lining tube 1 is moved axially into the adjacent outer sleeve tube 2 such that the radial support between each two adjacent outer sleeve tubes 2 is eliminated, so that all outer sleeve tubes 2 can be bent along with the flexible ropes 3, thereby achieving folding. Referring to FIG. 4, by pulling the inner lining tube 1 to the right along the arrow, the inner lining tube 1 can be moved into the adjacent outer sleeve tube 2 on the right. The unlocked state herein specifically refers to a state in which each inner lining tube 1 is located in each corresponding outer sleeve tube 2.

When the user uses the support frame SF, the support frame can be disassembled or assembled by pulling the inner lining tubes 1 as needed. As compared to the conventional support frames, there is no need to disassemble or assemble the support frame section by section, and there is no need to remove the part to be supported from the support frame for disassembling and assembling the support frame. The support frame as described herein makes disassembly and assembly of the support frame and the item of outdoor recreation equipment and furniture easier. Therefore, the convenience and stability of the support frame of the item of outdoor recreation equipment and furniture provided by the present application is improved.

In order to realize quick disassembly and assembly, a stopper 5 may be fixed in one outer sleeve tube 2. When the support frame is in the unlocked state, the inner lining tube 1 in the outer sleeve tube 2 having the stopper 5 abuts against the stopper 5 along the axial direction. When the inner lining tube 1 abuts against the stopper 5, all of the inner lining tubes 1 are completely located in their respective outer sleeve tube 2. The radial support force between two adjacent outer sleeve tubes 2 is removed to allow folding of the support frame. The stopper 5 prevents the inner lining tube 1 from further moving along the axial direction under the pulling force, which helps the user to quickly determine whether the support frame has entered the unlocked state and to quickly fold the outer sleeve tubes 2 in the unlocked state. As shown in the drawings, two stoppers 5 may be provided. One or more stoppers may also be provided. The stopper 5 may be mechanical fastener (e.g., a screw) penetrating through the wall of the outer sleeve tube 2. Multiple stoppers 5 may be provided and a stopper 5 may be provided for each outer sleeve tube 2.

As shown in the drawings, the number of the outer sleeve tubes 2 is one more than the number of the inner lining tubes 1, so as to ensure that all the outer sleeve tubes 2 can be butted in the axial direction under the action of the inner lining tubes 1.

The sum of the length of a single inner lining tube 1 and the length of the flexible rope 3 connected to one end of the inner lining tube 1 is equal to the length of a single outer sleeve tube 2. This ensures that each inner lining tube 1 can be completely moved into the corresponding outer sleeve tube 2, and avoids any inner lining tube 1 from moving out of any outer sleeve tube 2 in the unlocked state, all of which allows for the reliable folding of the outer sleeve tubes 2 and support frame SF.

As shown in the drawings, the length of the outer sleeve tubes 2 in the middle may be greater than the length of the outer sleeve tubes 2 at the head and tail ends, which does not affect the realization of the object of the present application.

In order to allow the inner lining tube 1 to slide smoothly in the central hole of the outer sleeve tube 2, the cross section area of each inner lining tube 1 is smaller than the cross section area of the central hole of the outer sleeve tube 2. Optionally, all the inner lining tubes 1 and all the outer sleeve tubes 2 are cylindrical, and are rigid tubes. The outer diameter of the inner lining tube 1 is smaller than the inner diameter of the central hole of the outer sleeve tube 2, so that the inner lining tube 1 can slide smoothly in the outer sleeve tube 2. The outer diameter of the inner lining tube 1 may be slightly smaller than the inner diameter of the central hole of the outer sleeve tube 2. Alternatively, the inner lining tube 1 and the outer sleeve tube 2 may be square tubes or another shape.

The inner lining tube 1 at a tail end TE (e.g., distal end) is provided with a pull ring 6, so that the inner lining tube 1 can be pulled easily. The pull ring 6 and the inner lining tube 1 at the tail end TE are connected by the flexible rope 3. Referring to FIG. 1, the inner lining tube 1 at the tail end TE specifically refers to the inner lining tube 1 at the rightmost end.

Flared flanges 21, which are folded outward along the radial direction of the outer sleeve tubes 2, are respectively provided at two ends of each outer sleeve tube 2. The outer diameter of the large diameter end of the flared flange 21 is larger than the outer diameter of the inner lining tube 1, so that the flared flanges 21 can guide the inner lining tubes 1 to smoothly slide into the outer sleeve tubes 2.

An item of outdoor recreation equipment and furniture may be provided with the support frame SF, and further, may include a carrying cover with a mounting hole. The support frame may be installed in the mounting hole. For instance, the item of outdoor recreation equipment and furniture may be a tent, a bed, a cot, a stool, or a seat. Accordingly, the carrying cover may be the outer cover of the tent, the flexible mattress of the bed, or the flexible cushion of the seat.

In the description above, the principle and embodiments of the present application are illustrated herein by specific examples. The description of the above embodiments is only intended to facilitate the understanding of the method and the concept of the present application. For those skilled in the art, changes can be made to specific embodiments and an application scope of the present application, according to the concepts of the application. In conclusion, contents of the specification should not be construed as limitation to the present application.

What is claimed is:

1. A support frame for an outdoor appliance, the support frame having a head end and a distal end, the support frame being configurable between a locked state and unlocked state, the support frame comprising:

a plurality of inner lining tubes connected end to end by flexible ropes, one of the inner lining tubes being arranged adjacent to the head end of the support frame, the plurality of inner lining tubes being adapted and configured such that when the support frame is in the locked state, the plurality of inner lining tubes extends successively end to end from adjacent the head end of the support frame to adjacent the distal end of the support frame;

a plurality of outer sleeve tubes adapted and configured to slide on outer surfaces of the inner lining tubes, one of the outer sleeve tubes being arranged adjacent to the head end of the support frame, the plurality of outer sleeve tubes being adapted and configured such that when the support frame is in the locked state, the plurality of outer sleeve tubes extends successively end to end from adjacent the head end of the support frame to adjacent the distal end of the support frame; and an elastic member having first and second ends, the first end of the elastic member being fixedly connected to the outer sleeve tube arranged at the head end of the support frame, the second end of the elastic member being fixedly connected to the inner lining tube at the head end of the support frame, the elastic member being adapted and configured to urge the inner lining tube at the head end of the support frame to move within the outer sleeve tube arranged at the head end of the support frame;

wherein when the support frame is in a locked state, the elastic member allows the inner lining tube at the head end of the support frame to be partially positioned within the outer sleeve tube arranged at the head end of the support frame and partially positioned within a next longitudinal axially adjacent outer sleeve tube, and another inner lining tube in the plurality of inner lining tubes is partially positioned within another outer sleeve tube in the plurality of outer sleeve tubes and partially positioned within a next longitudinal axially adjacent outer sleeve tube such that the outer sleeve tubes are axially abutted along the inner lining tubes to extend the support frame; and when the support frame is in an unlocked state, the inner lining tube at the head end of the support frame is moved out of the outer sleeve tube arranged at a head end of the support frame against bias of the elastic member and positioned within a next longitudinal axially adjacent outer sleeve tube, and another inner lining tube in the plurality of inner lining tubes is moved out of another outer sleeve tube in the plurality of outer sleeve tubes and positioned within a next longitudinal axially adjacent outer sleeve tube such that the outer sleeve tubes are foldable about the flexible ropes for folding the support frame.

2. The support frame of the outdoor appliance according to claim 1, wherein a length of an inner lining tube and the length of the flexible rope connected to an end of the respective inner lining tube corresponds to a length of an axially adjacent outer sleeve tube.

3. The support frame of the outdoor appliance according to claim 1, further comprising a stopper mounted in an outer sleeve tube of the plurality of outer sleeve tubes, the stopper being adapted and configured such that when the support frame is in the unlocked state, the inner lining tube axially adjacent the outer sleeve tube with the stopper abuts the stopper to prevent the inner lining tube from moving axially within the axially adjacent outer sleeve tube force.

4. The support frame of the outdoor appliance according to claim 1, wherein a number of outer sleeve tubes in the plurality of outer sleeve tubes is one more than a number of inner lining tubes in the plurality of inner sleeve tubes.

5. The support frame of the outdoor appliance according to claim 1, wherein a cross section area of each inner lining tube is smaller than a cross section area of a central hole of the outer sleeve tube.

6. The support frame of the outdoor appliance according to claim 1 wherein the inner surface of each of the outer sleeve tubes is adapted and configured to slidingly receive the respective axially adjacent inner lining tube.

7. The support frame of the outdoor appliance according to claim 1, wherein the inner lining tube adjacent the distal end of the support frame is provided with a pull ring.

8. The support frame of the outdoor appliance according to claim 7, wherein the pull ring and the inner lining tube at the distal end of the support frame are connected by a flexible rope.

9. The support frame of the outdoor appliance according to claim 1, wherein each of the outer sleeve tubes has opposite ends with flared flanges extending outward along a radial direction of the outer sleeve tubes.

10. The support frame of the outdoor appliance according to claim 1, wherein each of the flexible ropes is a steel wire rope.

11. The support frame of the outdoor appliance according to claim 1, wherein the elastic member is one of a TPE rope and a tension spring.

12. A support frame for an outdoor appliance, the support frame having a head end and a distal end, the support frame being configurable between a locked state and unlocked state, the support frame comprising:

a plurality of outer sleeve tubes, one of the outer sleeve tubes being arranged adjacent to the head end of the support frame, the plurality of outer sleeve tubes being adapted and configured such that when the support frame is in the locked state, the plurality of outer sleeve tubes extends successively end to end from adjacent the head end of the support frame to adjacent the distal end of the support frame;

a plurality of inner lining tubes connected end to end by flexible ropes, one of the inner lining tubes being arranged adjacent to the head end of the support frame, the plurality of inner lining tubes being adapted and configured such that when the support frame is in the locked state, the plurality of inner lining tubes extends successively end to end from adjacent the head end of the support frame to adjacent the distal end of the support frame, each inner lining tube in the plurality of inner lining tubes being adapted and configured to slide within axially adjacent outer sleeve tubes; and an elastic member having first and second ends, the first end of the elastic member being fixedly connected to the outer sleeve tube arranged at the head end of the support frame, the second end of the elastic member being fixedly connected to the inner lining tube at the head end of the support frame, the elastic member being adapted and configured to urge the inner lining tube at the head end of the support frame to move within the outer sleeve tube arranged at the head end of the support frame;

wherein when the support frame is in a locked state, the elastic member allows the inner lining tube at the head end of the support frame to be partially positioned within the outer sleeve tube arranged at the head end of the support frame and partially positioned within a next longitudinal axially adjacent outer sleeve tube, and another inner lining tube in the plurality of inner lining tubes is partially positioned within another outer sleeve tube in the plurality of outer sleeve tubes and partially positioned within a next longitudinal axially adjacent outer sleeve tube such that the outer sleeve tubes are axially abutted along the inner lining tubes to extend the support frame; and when the support frame is in an unlocked state, the inner lining tube at the head end of the support frame is moved out of the outer sleeve tube arranged at a head end of the support frame against bias of the elastic member and positioned within a next longitudinal axially adjacent outer sleeve tube, and another inner lining tube in the plurality of inner lining tubes is moved out of another outer sleeve tube in the plurality of outer sleeve tubes and positioned within a next longitudinal axially adjacent outer sleeve tube such that the outer sleeve tubes are foldable about the flexible ropes for folding the support frame.

13. The support frame of the outdoor appliance according to claim 12, wherein a length of an inner lining tube and the length of the flexible rope connected to an end of the respective inner lining tube corresponds to a length of an axially adjacent outer sleeve tube.

14. The support frame of the outdoor appliance according to claim 12, further comprising a stopper mounted in an outer sleeve tube of the plurality of outer sleeve tubes, the stopper being adapted and configured such that when the support frame is in the unlocked state, the inner lining tube axially adjacent the outer sleeve tube with the stopper abuts the stopper to prevent the inner lining tube from moving axially within the axially adjacent outer sleeve tube force.

15. The support frame of the outdoor appliance according to claim 12, wherein a number of outer sleeve tubes in the plurality of outer sleeve tubes is one more than a number of inner lining tubes in the plurality of inner sleeve tubes.

16. The support frame of the outdoor appliance according to claim 12, wherein a cross section area of each inner lining tube is smaller than a cross section area of a central hole of the outer sleeve tube.

17. The support frame of the outdoor appliance according to claim 12, wherein the inner lining tube adjacent the distal end of the support frame is provided with a pull ring.

18. The support frame of the outdoor appliance according to claim 17, wherein the pull ring and the inner lining tube at the distal end of the support frame are connected by a flexible rope.

19. The support frame of the outdoor appliance according to claim 12, wherein each of the outer sleeve tubes has opposite ends with flared flanges extending outward along a radial direction of the outer sleeve tubes.

20. The support frame of the outdoor appliance according to claim 12, wherein the elastic member is one of a TPE rope and a tension spring.

\* \* \* \* \*